US012168887B2

(12) United States Patent
Promutico et al.

(10) Patent No.: US 12,168,887 B2
(45) Date of Patent: Dec. 17, 2024

(54) DOOR LOCKING DEVICE

(71) Applicant: BITRON S.p.A., Turin (IT)

(72) Inventors: Fabrizio Promutico, Turin (IT); Stefano Colucci, Turin (IT)

(73) Assignee: Bitron S.p.A., Turin (IT)

( * ) Notice: Subject to any disclaimer, the term of this patent is extended or adjusted under 35 U.S.C. 154(b) by 115 days.

(21) Appl. No.: 17/070,949

(22) Filed: Oct. 15, 2020

(65) Prior Publication Data

US 2021/0115702 A1 Apr. 22, 2021

(30) Foreign Application Priority Data

Oct. 15, 2019 (IT) ........................ 102019000018812

(51) Int. Cl.
*E05B 17/00* (2006.01)
*A47L 15/42* (2006.01)
(Continued)

(52) U.S. Cl.
CPC ........ *E05B 17/002* (2013.01); *A47L 15/4259* (2013.01); *D06F 39/14* (2013.01);
(Continued)

(58) Field of Classification Search
CPC .. E05B 17/002; E05B 9/02; E05B 2047/0017; E05B 2047/002;
(Continued)

(56) References Cited

U.S. PATENT DOCUMENTS 4,413,592 A * 11/1983 Jones .................... A47L 15/421 122/504
5,437,303 A * 8/1995 Johnson ................ D06F 39/081 4/251.1

FOREIGN PATENT DOCUMENTS

CN 2837339 11/2006
CN 102154803 8/2011
(Continued)

OTHER PUBLICATIONS

Rapporto di Ricerca e Opinione Scritta [Search Report and Written Opinion] Dated Jun. 3, 2020 From the Ministero Dello Sviluppo Economico. Direzione Generale Sviluppo Produttivo e Competitivita, Ufficio Italiano Brevetti e Marchi Re. Application No. IT201900018812. (10 Pages).

(Continued)

*Primary Examiner* — Christine M Mills
*Assistant Examiner* — Peter H Watson

(57) ABSTRACT

The present invention relates to a Door locking device (1) comprising a containment casing (I), having a window (34), a slider (5), comprising a locking portion (51), intended to engage with a door (91) of an appliance (9), wherein said slider (5) is contained in said containment casing (I) and wherein said slider (5) is capable of assuming a retracted position, in which said locking portion (51) is at least partially contained in said containment envelope (I), and an extracted position in which said locking portion (51) is at least partially extracted from said containment envelope (I), moving through said window (34), and a moving and controlling system (6, 7) of said slider (5), configured for allowing the passage of said slider (5) from said retracted position to said extracted position and vice-versa, characterized in that said containment casing (I) comprises a base (2), a containment intermediate element (3), couplable with said base (2), and a top lid (4), couplable with said containment intermediate element (3), wherein said moving and controlling system (6, 7) is arranged between said base (2) and said containment intermediate element (3) and wherein said slider (5) is interposed between said containment intermediate element (3) and said top lid (4).

5 Claims, 13 Drawing Sheets

(51) Int. Cl.
*D06F 39/14* (2006.01)
*E05B 9/02* (2006.01)
*E05B 47/00* (2006.01)

(52) U.S. Cl.
CPC ............ *E05B 9/02* (2013.01); *E05B 47/0012* (2013.01); *E05B 2047/0016* (2013.01); *E05B 2047/002* (2013.01); *E05Y 2900/304* (2013.01); *E05Y 2900/312* (2013.01)

(58) Field of Classification Search
CPC ..... E05B 2047/0086; E05B 2047/0024; E05B 2047/0036; E05B 2047/0081; E05B 47/0012; D06F 37/42; D06F 39/081; D06F 39/14; A47L 15/4259; Y10S 292/1021; Y10S 292/306; Y10S 292/307; Y10S 292/69; Y10S 292/696; Y10S 292/699
See application file for complete search history.

(56) References Cited

FOREIGN PATENT DOCUMENTS

| | | | | | |
|---|---|---|---|---|---|
| CN | 101892571 | | | 4/2012 | |
| CN | 203741614 | | | 7/2014 | |
| CN | 106522698 | | | 3/2017 | |
| CN | 206503004 | | | 9/2017 | |
| CN | 109469415 | | | 3/2019 | |
| EP | 3224399 | | | 10/2017 | |
| KR | 100820739 | B1 | * | 4/2008 | ............. D06F 37/42 |
| KR | 20-2012-0004174 | | | 6/2012 | |
| KR | 20120004174 | U | * | 6/2013 | ............. D06F 39/14 |
| KR | 20180060558 | A | * | 6/2018 | ......... E05B 47/0012 |
| KR | 10-1855470 | | | 7/2018 | |
| KR | 101855470 | B1 | * | 7/2018 | ............. D06F 39/14 |
| WO | WO-2014017783 | A1 | * | 1/2014 | ............. D06F 37/28 |
| WO | WO-2020212930 | A1 | * | 10/2020 | ............. D06F 39/14 |

OTHER PUBLICATIONS

Notice to Submit Comments Dated Jun. 18, 2024 From the Korean Intellectual Property Office Re. Application No. 10-2020-0133262 and Its Translation Into English. (7 Pages).

Notification of Office Action and Search Report Dated Dec. 6, 2022 From the State Intellectual Property Office of the People's Republic of China Re. Application No. 202011098692.X. (8 Pages).

* cited by examiner

DOOR LOCKING DEVICE

RELATED APPLICATION

This application claims the benefit of priority of Italian Patent Application No. 102019000018812 filed on Oct. 15, 2019, the contents of which are incorporated herein by reference in their entirety.

FIELD AND BACKGROUND OF THE INVENTION

The present invention relates to an improved door locking device.

More specifically, the invention relates to a door locking device for washing machines, designed and manufactured in particular to allow the protection of internal parts of the door locking device itself from humidity or drops of water that can escape from the washing compartment of the washing machine, due to the rotation of the drum, but which can be used for any household appliance, in which it is necessary to protect active or operational parts from humidity.

In the following the description will be directed to the application of the door locking device to a washing machine, but it is apparent that it should not be considered limited to this specific use.

As is well known, door locking devices are suitable for locking or unlocking the door of a household appliance, such as, in particular, a washing machine or a dishwasher.

The door locking devices currently on the market are electromechanical elements, that are made of mechanical components equipped with electrical actuators, such as an electric motor and the like, for moving members, such as sliders and the like, for the automated locking and unlocking operations of a door.

In this case, it is also possible to provide programmable devices for the programmed management of the door opening operations. Therefore, said door locking devices are also equipped with signal and power connectors.

A well-known problem in the field is that of protection from water or humidity of the internal parts of the door locking devices.

It can happen, in fact, that during the washing phases, water can flow out from the washing machine drum, and it can wet the electrical parts of the door locking device, thereby affecting its operation.

In order to prevent this drawback, systems for isolating the enclosures for containing the door locking devices are known.

However, such systems do not always appear to be able to protect the door locking device.

Furthermore, as it is known, the door locking devices are equipped with sliders able to engage with the door of the household appliance. Said sliders usually come out from a containment casing, by passing through an opening or a window. It happens very often that moisture or water can penetrate through the window by flowing over the top surface of the slider. Therefore, the sliders are often equipped with grooves or holes to allow the water to drip.

However, when the quantity of water that comes out of the drum is large, the above solutions are often not sufficient and water can still enter into the door locking device.

SUMMARY OF THE INVENTION

In light of the above, it is therefore an object of the present invention to propose a door locking device that can overcome the limits of the solutions according to the prior art.

Another object of the invention is to propose a door locking device having a structure that can be easily and economically engineered for industrial production.

It is therefore specific object of the present invention a door locking device comprising a containment casing, having a window, a slider, comprising a locking portion, intended to engage with a door of an appliance, wherein said slider is contained in said containment casing and wherein said slider is capable of assuming a retracted position, in which said locking portion is at least partially contained in said containment envelope, and an extracted position in which said locking portion is at least partially extracted from said containment envelope, moving through said window, and a moving and controlling system of said slider, configured for allowing the passage of said slider from said retracted position to said extracted position and vice-versa, characterized in that said containment casing comprises a base, a containment intermediate element, couplable with said base, and a top lid, couplable with said containment intermediate element, wherein said moving and controlling system is arranged between said base and said containment intermediate element and wherein said slider is interposed between said containment intermediate element and said top lid.

Always according to the invention, said containment intermediate element may comprise an upper surface, a couple of parallel bulkheads, arranged at the lateral edges of said upper surface, and further bulkheads, extending along a lateral surface opposite to the one on which said window is located, arranged so as to surround a front opening.

Still according to the invention, said slider may comprise lateral ribs for containing possible water drops that may fall on said locking portion and drain them on said upper surface of said containment intermediate element.

Advantageously according to the invention, said locking portion may have a groove on the top and/or two through holes for allowing drainage of water that may fall on said locking portion when said slider is in said extracted position.

Further according to the invention, said slider may comprise a flat drainage element, arranged at the rear of said locking portion and having a steep or a slightly sloping surface, in order to drain water on said locking portion on the upper surface of said containment intermediate element.

Always according to the invention, said moving and controlling system may comprise an electronic control unit comprising in turn: a print circuit board arranged below of said upper surface of said containment intermediate element and an electrical connector intended to be connected to the logic control unit of a washing machine, an appliance or the like, wherein said electrical connector is connected to, and fixed on said print circuit board and wherein said electrical connector is arranged at said front opening; or is made of a comolded plastic support, inside tracks and metal connections are arranged.

Still according to the invention, said base may have a first housing and a second housing, said slider may comprise a rack, and said moving and controlling system may comprise moving means comprising in turn an electric motor, arranged in said first housing of said base, reducing members, arranged in said second housing for transferring the motion from said electric motor to said rack for allowing the passage of said slider from said retracted position to said extracted position and vice-versa.

Advantageously according to the invention, said reducing members may comprise a pinion, keyed to the shaft of said motor, a gearwheel arranged in said second housing of said base, engaged with said pinion of said shaft, a further pinion coaxial to said gearwheel, engaged with said rack of said slider.

Preferably according to the invention, said moving means may comprise a further pinion coaxial to said gearwheel, and said slider may comprise a further rack, engaged with said further pinion.

Always according to the invention, said slider may have a constrained path), and said device may comprise a controlling member, having a first end, pivoted on said containment element, and a second end engaged so as to slide inside the abovementioned constrained path, and a return spring, intended to return the slider in position, wherein said constrained path and the arrangement of said return spring are configured so as to allow the passage of said slider from said retracted position to an extracted position and vice-versa by activating said electric motor making it rotate in only one direction.

Still according to the invention, said constrained path may have a first seat, a second seat, opposite to said first seat, a third seat, arranged at the rear of said first seat, and a fourth seat, opposite to said first seat and parallel to said second seat.

Advantageously according to the invention, said top lid may comprise a flat portion, having longitudinal reliefs, arranged parallel to each other, adapted to channel the water that may fall on it, and a steep portion having edges facing downwards.

BRIEF DESCRIPTION OF THE SEVERAL VIEWS OF THE DRAWINGS

The present invention will be now described, for illustrative but not limitative purposes, according to its preferred embodiments, with particular reference to the figures of the enclosed drawings, wherein.

In the various figures, similar parts will be indicated by the same reference numbers.

DESCRIPTION OF SPECIFIC EMBODIMENTS OF THE INVENTION

Figure 1:
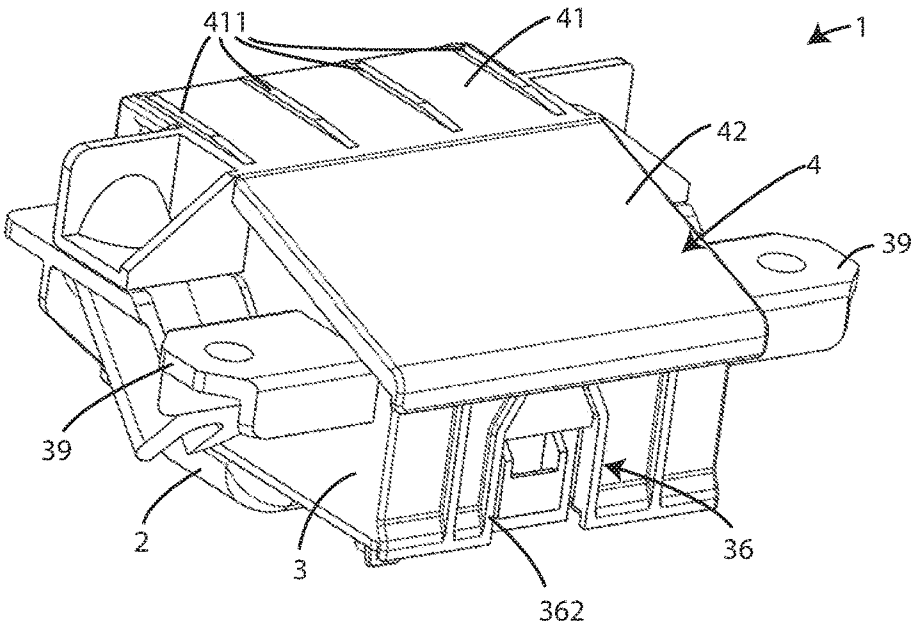
FIG. 1 shows an overall view of the door locking device according to the present invention.
Figure 2:
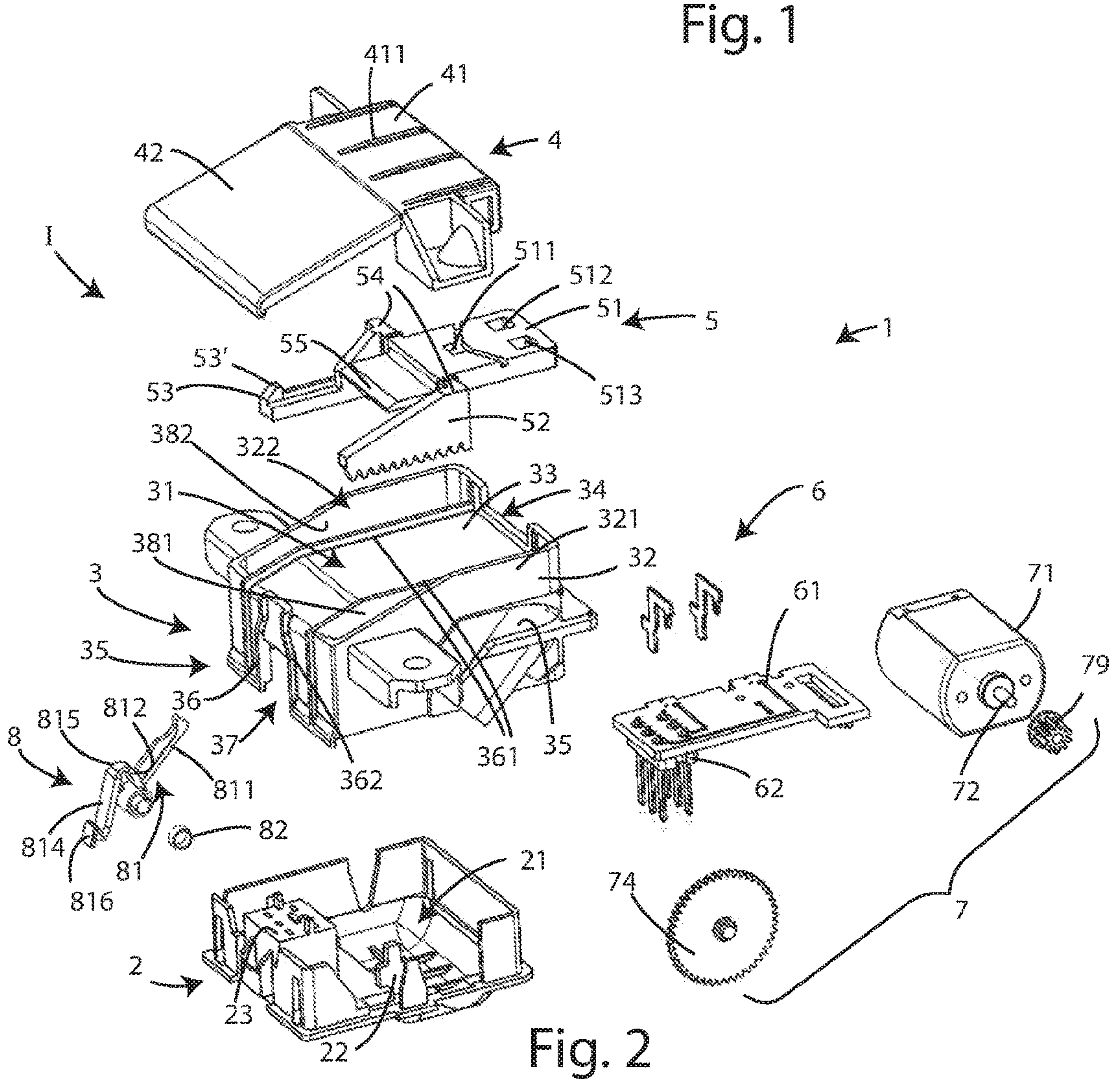
FIG. 2 shows an exploded view of the door locking device according to FIG. 1.

Referring to and FIGS. 1 and 2, the door locking device according to the present invention is shown, wholly designated by reference number 1.

The door locking device 1 essentially comprises a base 2, a containment element 3, an upper cover 4, a slider 5, an electronic control unit 6, moving means 7, and an emergency unlocking system 8.

The base 2 has a first housing 21 and a second housing 22, the function of which will be better explained below.

Furthermore, said base 2 also has a connector support 23, in which an electrical connector can be inserted.

Figure 3:
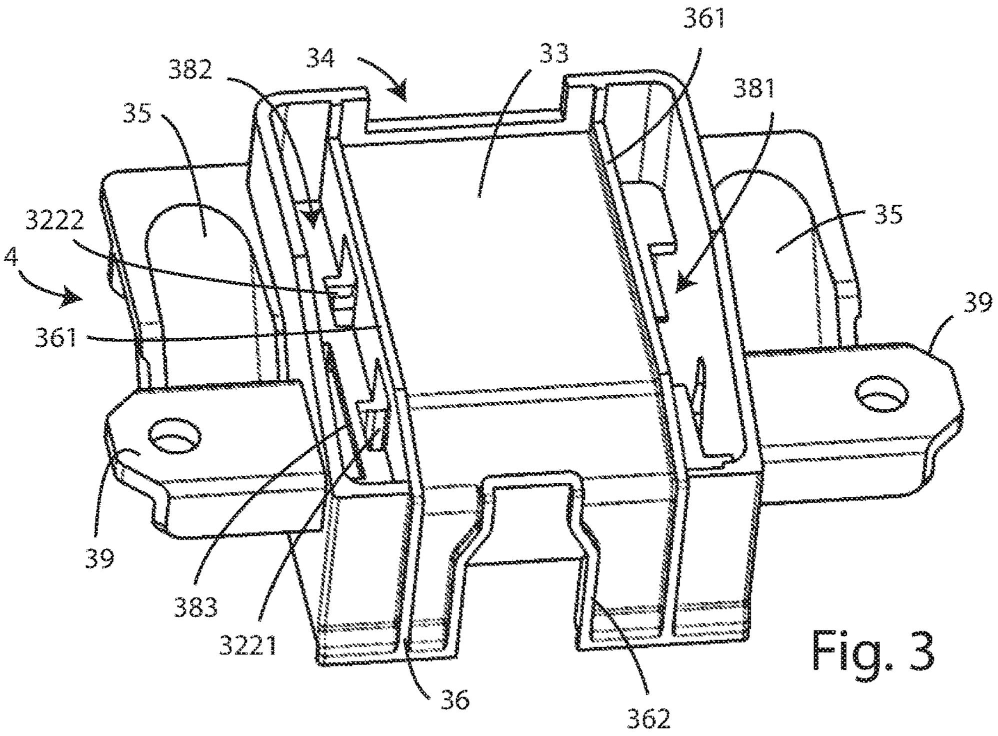
FIG. 3 shows a perspective view of a containment intermediate element of the door locking device according to the present invention.
Figure 4:
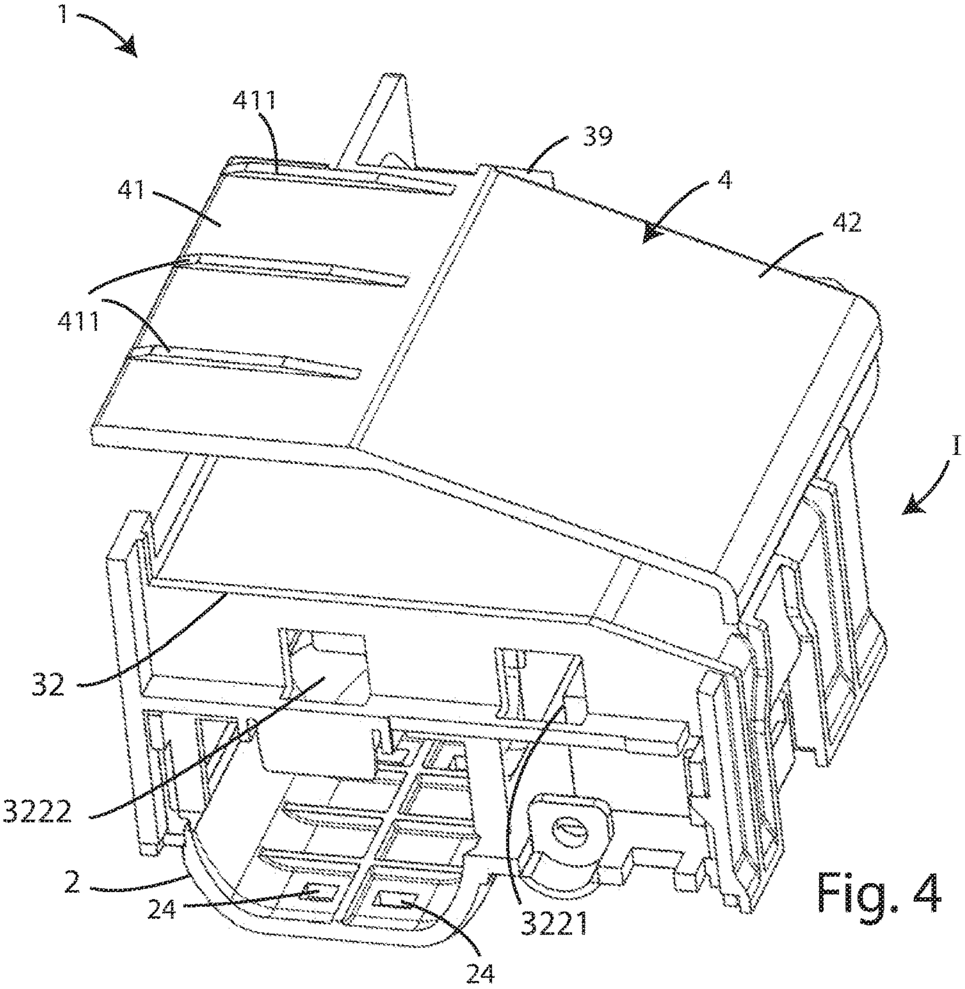
FIG. 4 shows a partially sectioned perspective view of the containment casing of the door locking device according to the present invention.
Figure 5:
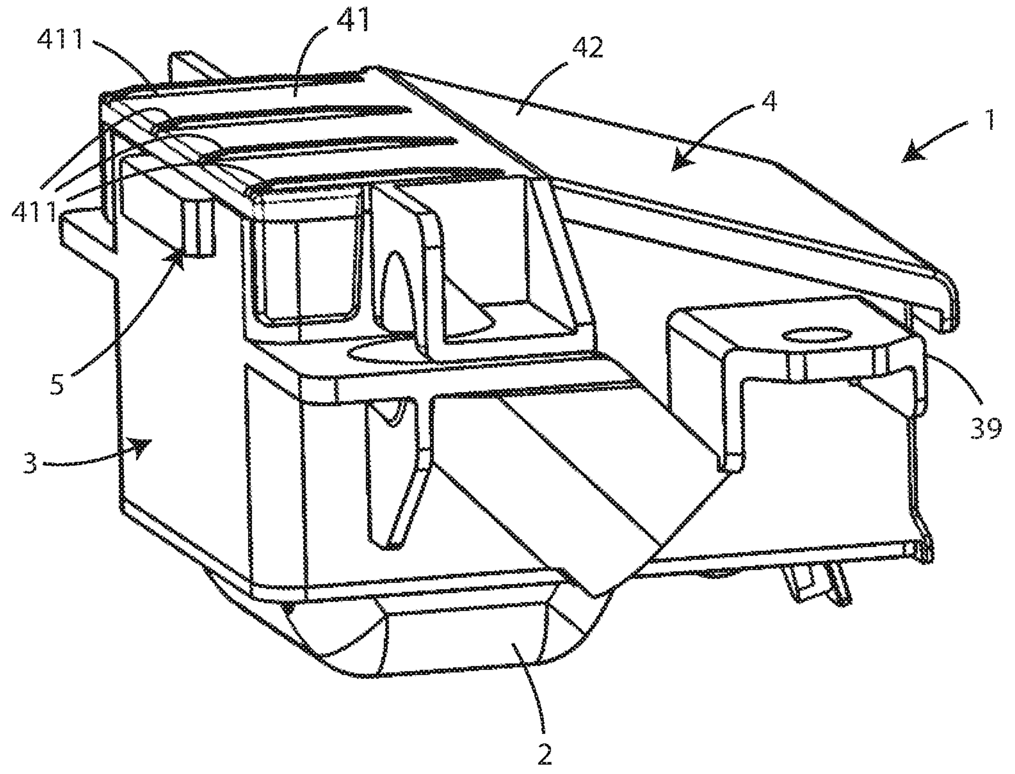
FIG. 5 shows a rear perspective view of the door locking device according to the present invention in the configuration in which the slider is in the retracted position.

Referring also to FIGS. 3, 4, and 5, it can be observed that the containment intermediate element 3 can be mechanically coupled to said base 2, by means of coupling means (such as screws and the like) or, more preferably, by interlocking, and it is substantially hollow on the outside, so as to define, with said base 2, said first housing 21, and said second housing 22.

Said containment intermediate element 3, together with said top lid 4, also defines a third housing 31 by means of the two side walls 32, indicated respectively with 321 and 322, and the upper surface 33 of the containment intermediate element 3 itself. Still, by means of said top lid said opening 34 is identified.

On the external wall of said side wall 322 there are two windows 3221 and 3222, horizontally aligned.

On the side, said containment intermediate element 3 also has holes 35 for fixing screws (not shown in the figure), while, between the upper surface 33 and the front surface, opposite the rear surface, on which said opening 34 is identified, a bulkheads system 36 is provided. In particular, said bulkheads system 36 has a pair of parallel bulkheads 361, which laterally delimit said upper surface 33, and the additional bulkheads 362, which extend along said front surface to delimit a front opening 37, whose function will be better explained below. The parallel bulkheads 361 and the further bulkheads 362 are seamless.

Furthermore, on one side, said containment intermediate element 3 has a first interspace 381, while on the opposite side, it has a second interspace 382.

The upper surface 33 in fact is interposed between said first interspace 381 and said second interspace 382.

In addition, said first 381 and second 382 interspace are delimited also by said pair of bulkheads 361. Laterally, said lateral housing 382 also has a slot 383.

The containment intermediate element 3 also comprises fixing tabs 3 9, for fixing the entire door locking device 1 to the household appliance that equips it.

The top lid 4 has a shape suitable for being arranged on the walls 32, covering the entire surface of said containment intermediate element 3, having side edges suitable for being arranged externally to said side walls 32.

Furthermore, when said top lid 4 is coupled to said containment intermediate element, as already indicated above, the opening 34 is completed.

The base 2, the containment intermediate element 3, and the top lid 4 form together, when coupled, the containment casing I of the door locking device 1 according to the present invention. The upper surface of said top lid 4 comprises a planar portion 41, having longitudinal reliefs 411, arranged parallel to each other, adapted to channel the water that may fall on the lid 4, and a steep portion 42, such that, when it is placed on said containment intermediate element 3, the edges remain facing downwards and projecting with respect to the perimeter of said containment intermediate element 3 itself.

The base 2 has on the convex bottom of the housing 21 to accommodate the motor (as indicated in FIG. 2), a set of rectangular holes 24, which can be seen in FIG. 4, which have the function of expelling any water drops that nevertheless enter into the base 2 of the door locking device.

Figure 6:
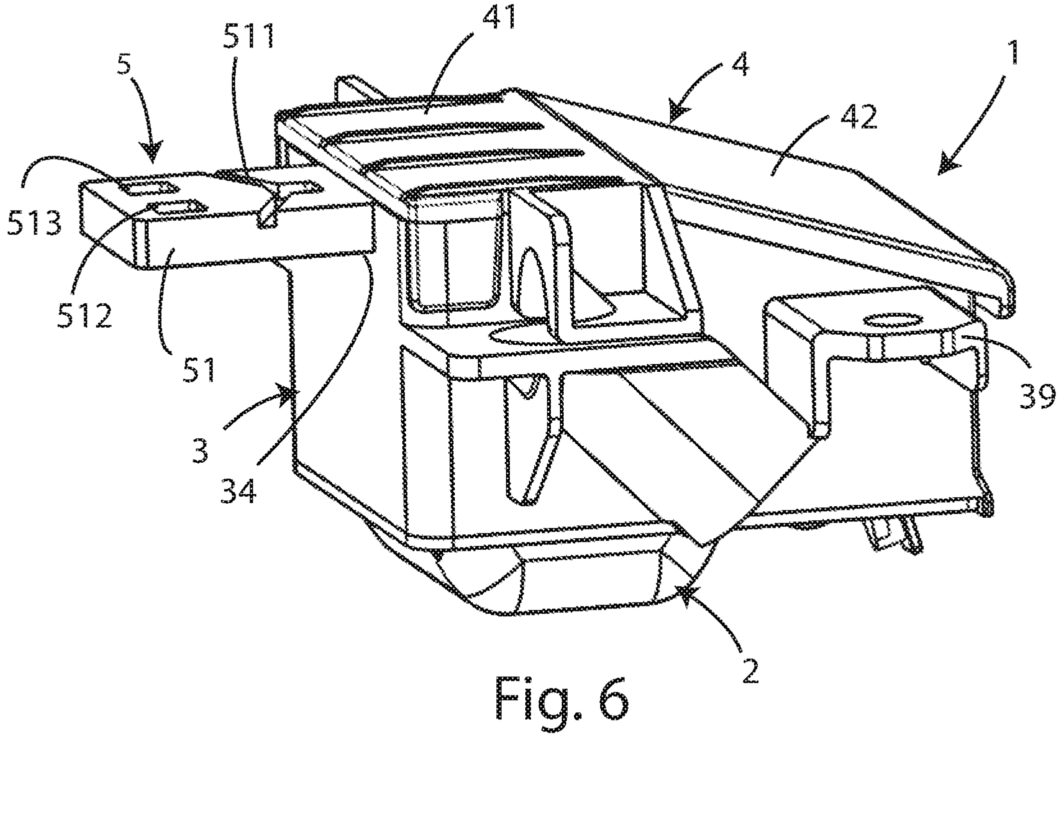
FIG. 6 shows a rear perspective view of the door locking device according to FIG. 4 in the configuration in which the slider is in the extracted position.
Figure 7:
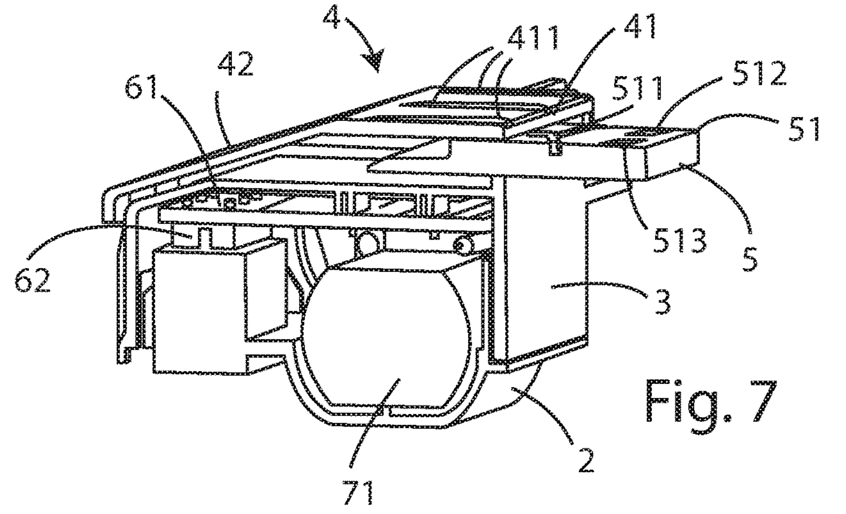
FIG. 7 shows the door locking device of FIG. 6 in a longitudinal section.

Said slider 5 is slidably movable and interposed between said containment intermediate element 3 and said top lid 4, so as to be able to assume a retracted position (see FIG. 5) and an extracted position (see FIGS. 6 and 7), passing through said window 34.

Figure 8:
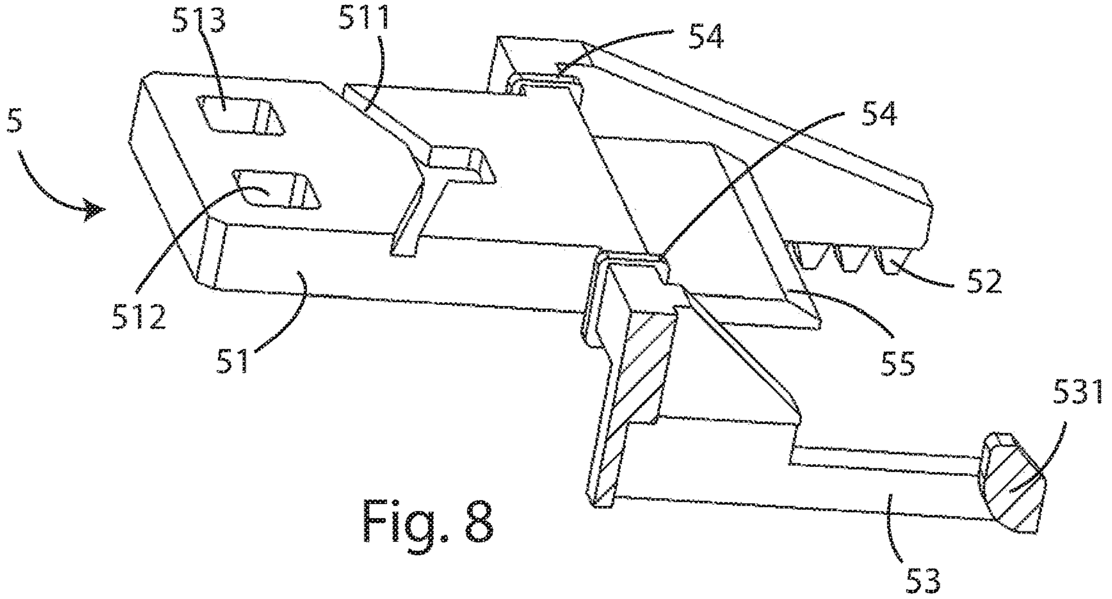
FIG. 8 shows a slider of the door locking device according to the present invention in a partially sectioned perspective view.

Said slider 5 has, also referring to FIG. 8, a locking portion 51, intended to be extracted through said opening 34, when said slider 5 assumes said extracted position, as well as intended to interact with the door of the washing machine or household appliance in general, which said door locking device 1 is installed in.

Said slider 5 also comprises a rack 52, inserted in said first interspace 381, and a longitudinal lever 53, provided with a tooth 531, inserted and able to slide in said lateral housing 382, movable even through said slot 383. Said locking portion 51 has a "Y"-shaped groove 511 on the top, and two through-holes 512 and 513 suitable for allowing the outflow or the passage of any water that may eventually fall on said locking portion 51.

Between said locking portion 51 and, respectively, said rack 52 and said longitudinal lever 53, said slider 5 also has some ribs 54 for containing any possible water drops that may fall on the slider 5, as it will be explained in detail below.

Finally, the slider 5 comprises, behind said locking portion 51, a flat drainage element 55, having a steep or slightly descending surface, for making the water to flow onto the upper surface 33 of said containment intermediate element 3.

In the assembly shown, the ribs 54 are within the parallel bulkheads 361, so that the water falls onto the upper surface 33.

Figure 9:
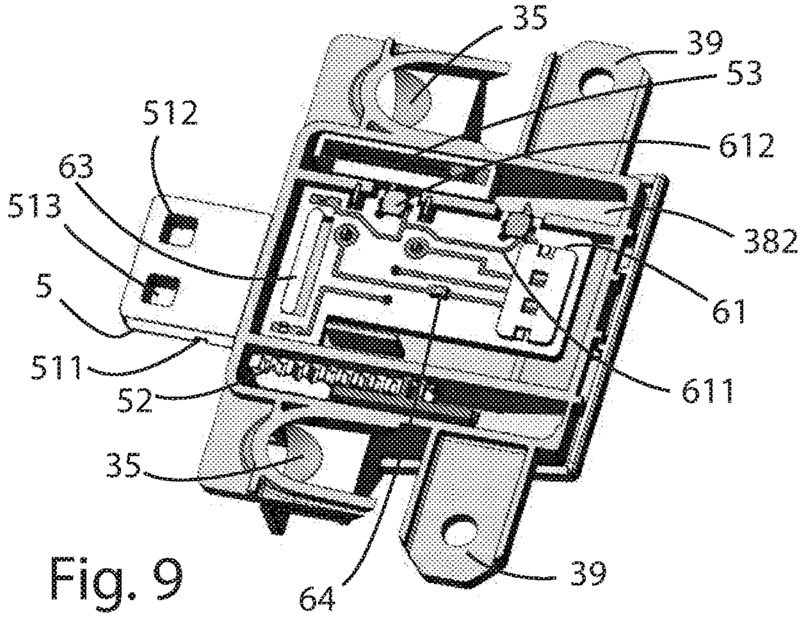
FIG. 9 shows a longitudinal section of the door locking device according to the present invention, in which it is possible to see the arrangement of the electronic control unit.
Figure 10:
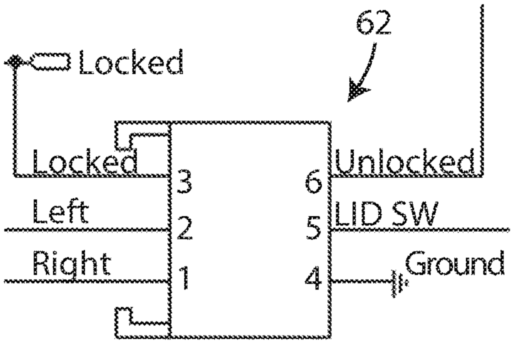
FIG. 10 shows the connections of an electrical connector.
Figure 11:
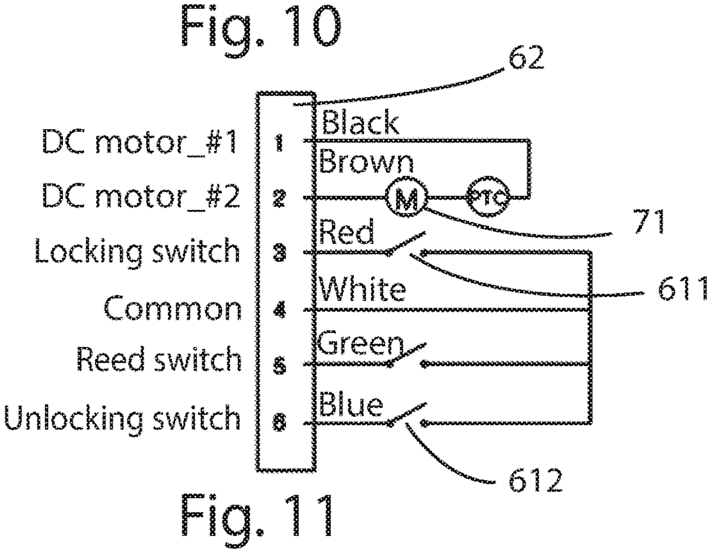
FIG. 11 shows the connection of the electrical connector to the various parts of the electrical circuit of the electronic control unit of the door locking device according to the present invention.

The electronic control unit 6, that can be seen in FIG. 9, comprises, in the case at issue, a printed circuit 61, arranged under said upper surface 33 of said containment intermediate device 3, so as to be protected, on which the circuits that connect electronic components are shown, also visible in FIGS. 10 and 11, including two microswitches 611 and 612, each arranged in correspondence with a respective one of said side windows 3221 and 3222 of said side wall 322, so that said longitudinal lever 53 of said slider 5 can interfere on them, when the latter is moved.

Said electronic control unit 6 also comprises an electric connector 62, connected and fixed on said printed circuit 61 and intended to be inserted into said connector support 23 of said base 2. Said connector 62 is intended to electronically and operationally connect the electrical circuits of said printed circuit 61 to the control logic of the household appliance (not shown in the figure), on which said door locking device 1 is installed.

Said electronic control unit 6 also includes a magnetic reed switch 63, to check the closed door or open door condition (as known in the art), and a PTC 64, to protect the electric motor 71, which actuates the device.

When the door locking device 1 is assembled, the electric connector 62 and the support for the connector 23 are placed in correspondence of said front opening 37, which, as said, is bounded and protected from any dripping by said additional bulkheads 362, as it will be better explained below.

Figure 12:
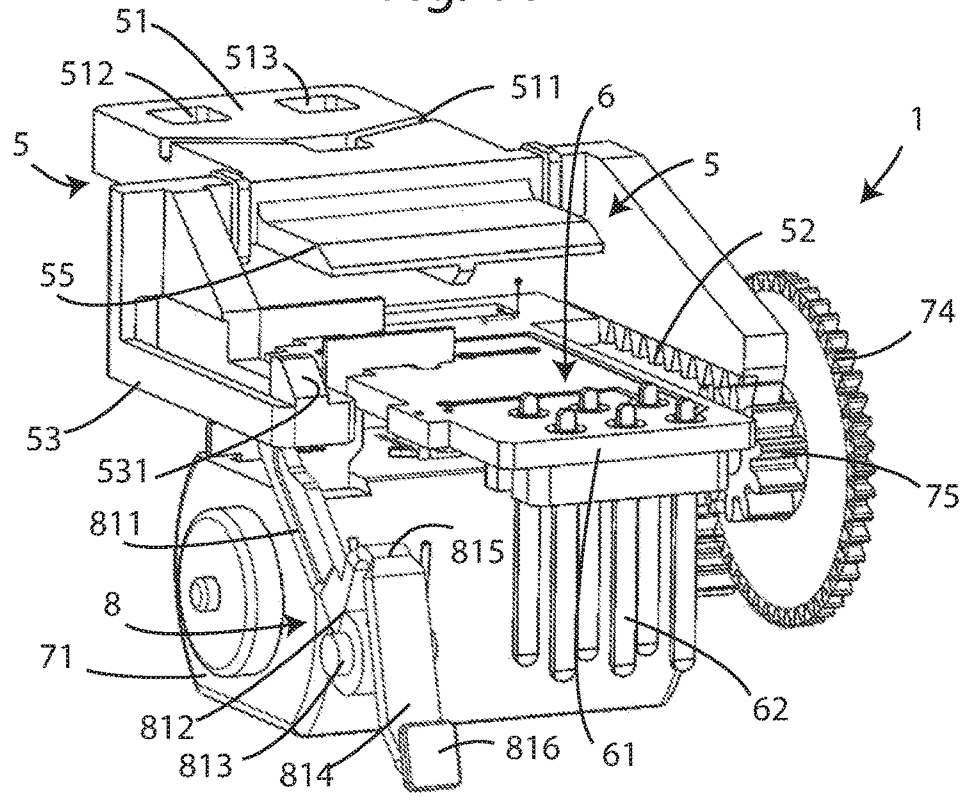
FIG. 12 shows the means for moving the door locking device according to the present invention in their coupling to the slider, in which the unlocking means assume a first configuration.
Figure 13:
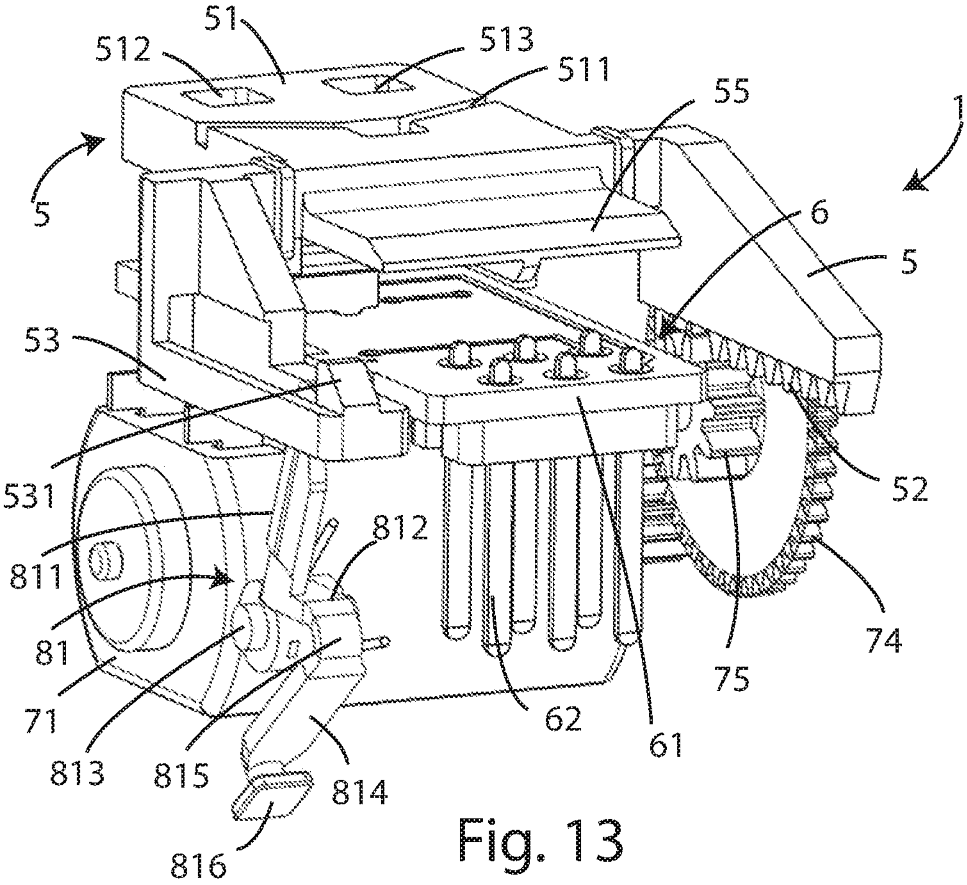
FIG. 13 shows the means for moving the door locking device according to the present invention in their coupling to the slider, in which the unlocking means assume a second configuration.

The moving means 7, that can be seen in FIGS. 12 and 13, comprise an electric motor 71 provided with a shaft 72, arranged in said first housing 21 of said base 2, a pinion 73, keyed on said shaft 72, a gearwheel 74 arranged in said second housing 22 of said base 2, engaged with said rack 52 of the slider 5, via a pinion 75 integral therewith.

Said electronic control unit 6 and said moving means 7 constitute the movement and control system of the slider 5.

Figure 14:
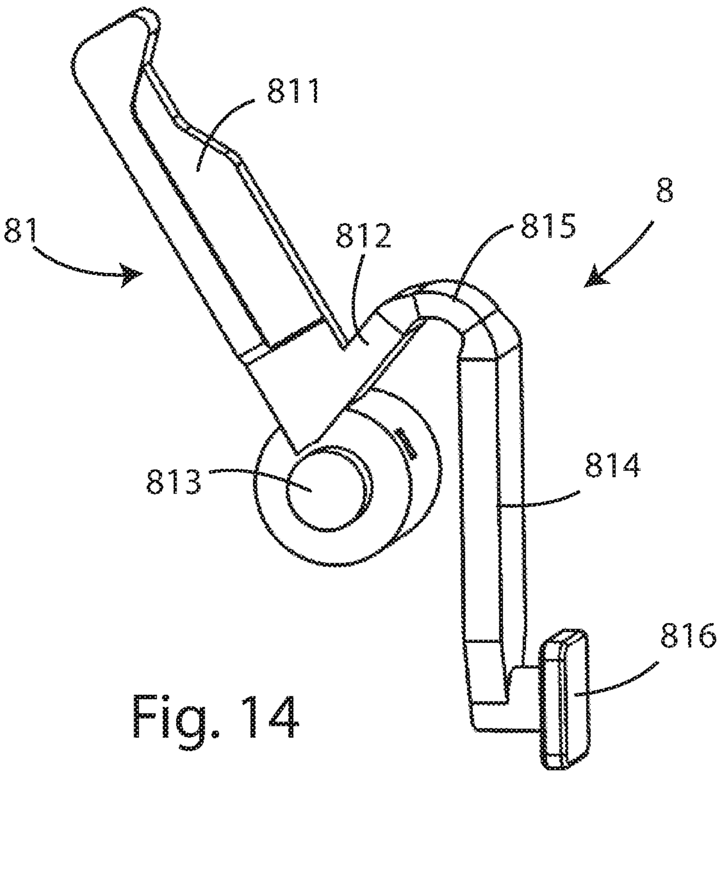
FIG. 14 shows an emergency release system of the door locking device according to the present invention.

The emergency unlocking system 8 comprises (see also FIG. 14) a lever 81, having a first portion 811, having a free end interfering with said tooth 531 of said longitudinal lever 53 of said slider 5, a second portion 812, that forms a "V" with said first portion 811, a pin 813, arranged between said first portion 811 and said second portion 812 at the vertex of the "V" that said first 811 and said second 812 portions form.

Said pin 813 is pivoted on said base 2.

Furthermore, said emergency unlocking system 8 also comprises a further longitudinal element 814, coupled at one end with said second portion 812, by means of a flexible elbow 815, which in the present embodiment is made of plastic. At the other end, said longitudinal element 814 comprises a release relief 816, which a lanyard or any other traction member (not shown in the figures) can be coupled to.

Said emergency unlocking system 8 also comprises a spiral spring 82, arranged on said pin 813, capable of holding said lever 81 in a predefined position as better described below.

The operation of the door locking device 1 described above is as follows.

More specifically, in order to better understand the operation of the door locking device 1, a functional operation and a protection operation will be distinguished with respect to possible drops of water that may fall on the door locking device 1 itself.

Figure 15:
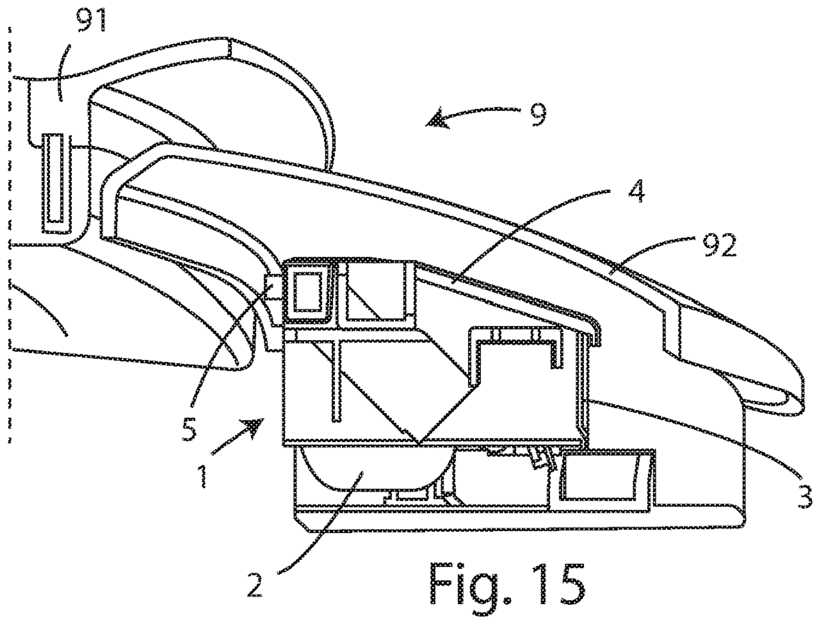
FIG. 15 shows a partial section of a washing machine to show the arrangement of the door locking device according to the present invention.

In any case, reference is now also made to FIG. 15, in which the installation of the door locking device 1 in a washing machine 9 is shown, of which the body or chassis 92 and the cover 91 are clearly distinguished. Of course, the slider 5, when it is in the extracted position, is configured to interfere with the lid 91, so as to hold it closed.

Regarding the functional operation, by means of the control logic of the washing machine 9 (not shown in the figure), connected via the electric connector 62 to the electronic control unit 6, it is allowed the driving of the motor 71 for rotating the gearwheel 74, which is in fact a reduction gear, by means of the pinion 73 moved by the motor shaft 72.

The pinion 75, engaged with the rack 52 of the slider 5, is thus capable of passing the slider 5 itself from the retracted position, in which the locking portion 51 of the slider 5 is fully or partially contained within the containment casing I, and in which said longitudinal lever 53 closes the microswitch 611 overlapping the respective window 3221, to the extracted position, in which the locking portion 51 of the slider 5 projects from said opening 34, and therefore from said containment casing I, and the longitudinal lever 53, thus moving, opens the microswitch 611 and closes the microswitch 612, physically overlapping the window 3222.

Upon the combined closure of the microswitches 611 and 612, the control logic unit of the washing machine 9 is capable of electronically determining whether the door 91 is locked or not. Whether the door 91 is closed or not is detected by the control unit of the washing machine through a signal sent by the reed switch 63 provided on the printed circuit 61, which interfaces, in case of closure, with a magnet placed on the door 91 in correspondence of the same (not indicated).

In this way, in said extracted position said slider 5 interferes with the door 91 of the washing machine 9, thus locking it in position.

Figure 16:
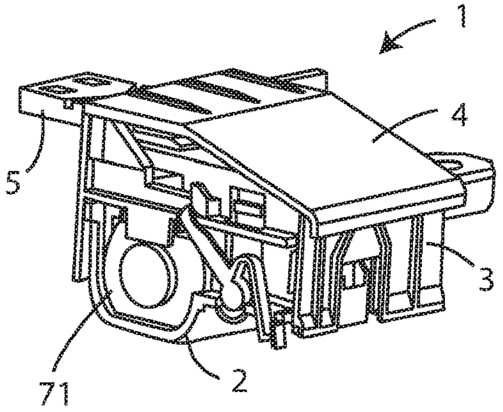
FIG. 16 shows the door locking device in the configuration in which the slider is in the extracted position.

Among other things, with reference to FIG. 16, when the slider 5 is in said extracted position, the lever 81 is in an initial position, in which it is held by the spiral spring 82, and in which it does not interfere with the movement of the slider 5.

Figure 17:
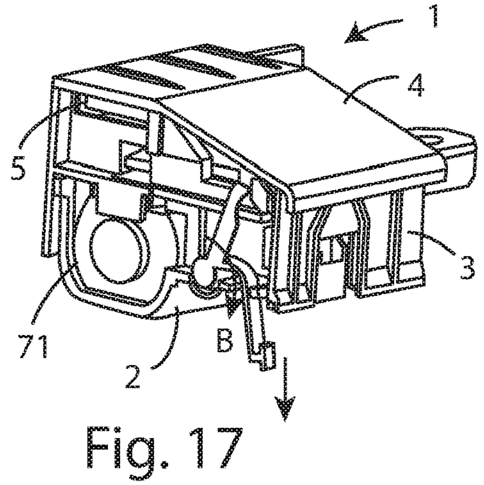
FIG. 17 shows the door locking device in the configuration in which the slider is forced into the retracted position.

In case it is necessary opening the door 91 for emergency reasons during the wash cycles, it is necessary to pull a lanyard or any mechanical element (not shown in FIG. 17) connected to the release relief 816, toward the arrow A.

In this way, due to the traction of the longitudinal element 814, by making the lever 81 rotate according to the arrow B, thanks to said flexible elbow 815, it is obtained that the free end of the first portion 811 would engage with the tooth 531 of said longitudinal lever 53, forcing said slider 5 to pass from said extracted position to said retracted position.

Figure 18:
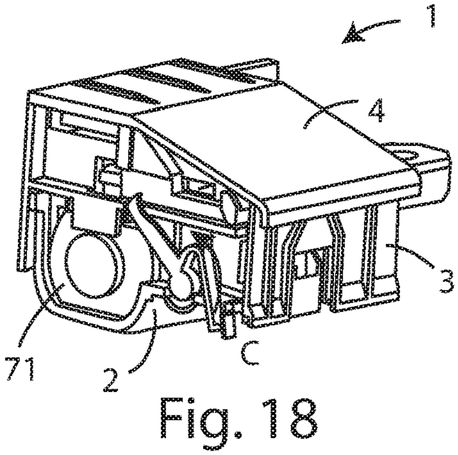
FIG. 18 shows the door locking device in the configuration in which the emergency release system is returned to its initial position.

Then, releasing the lanyard, the lever 81, due to the action of the spring 82, will return to its initial position by rotating in the direction of the arrow C, as shown in FIG. 18.

As mentioned above, however, very often water can leak from the drum, which often wets the door locking devices and the related electrical parts.

The door locking device 1 according to the invention, in case of the water would fall on the upper surface of the top lid 4, it would initially be channeled through the longitudinal reliefs 411 of the flat portion, which would tend not to make it fall laterally and possibly to divert it towards the steep portion 42, thus preventing it from entering the door locking device 1.

If the slider 5 is in the extracted position, part of the water may in any case fall onto the surface of the same, penetrating, for example, through the opening 34 inside the door locking device 1.

In this case, however, part of the water is collected by the groove 511, which tends to divert it, due to the "Y" shape at the sides, causing it to fall. Other part of the water can, however, be channeled and drip through the two through-holes 512 and 513, which are located approximately at the edge of said locking portion 51, so as to drain the water away from the body of the door locking device 1.

Figure 19:
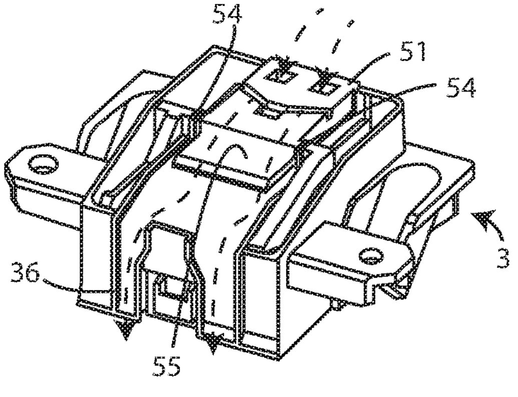
FIG. 19 shows how the water flows are distributed on the slider or the intermediate containment element of the door locking device according to the present invention.
Figure 20:
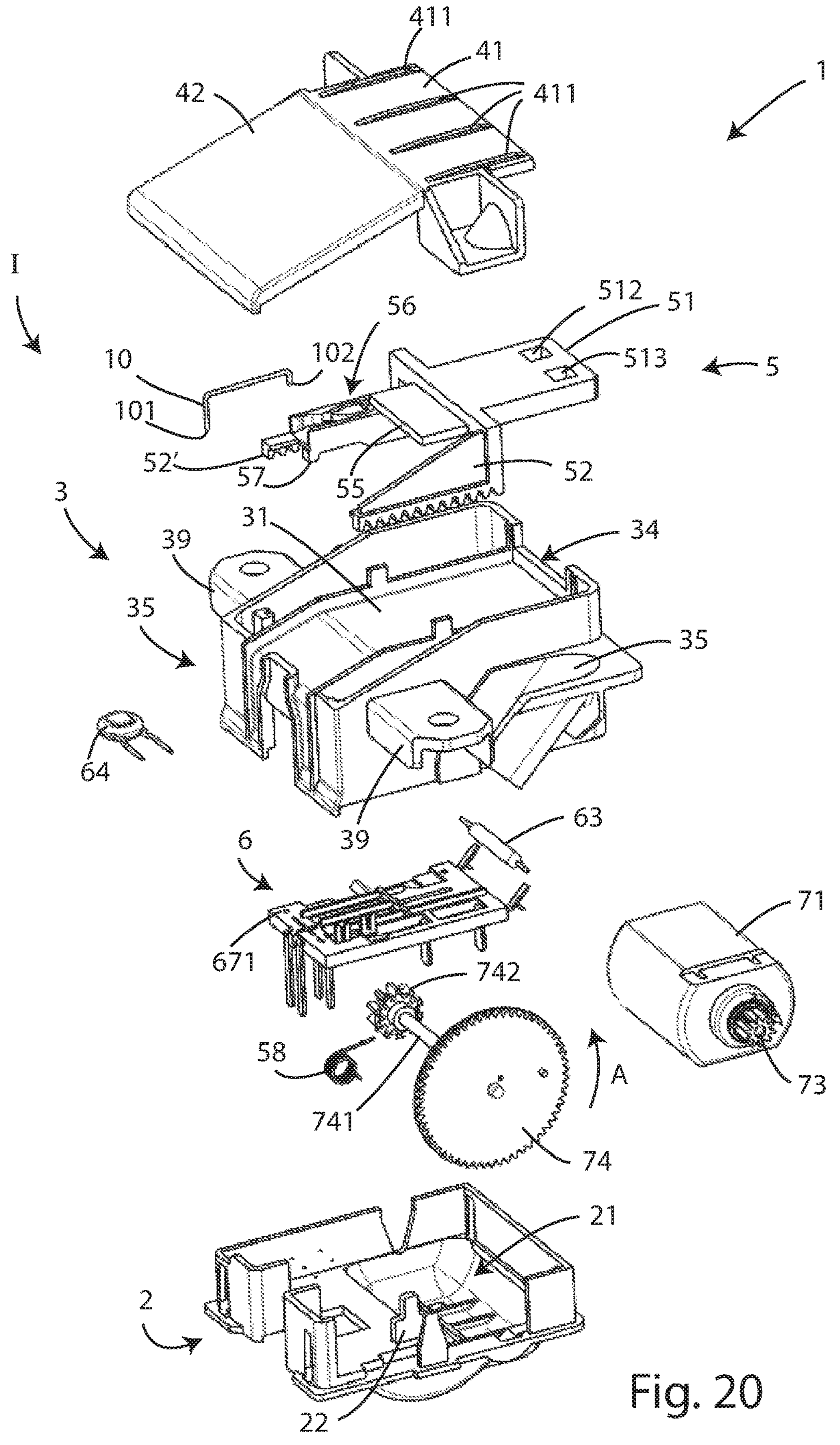
FIG. 20 shows an exploded view of a second embodiment of the door locking device according to the present invention.
Figure 21:
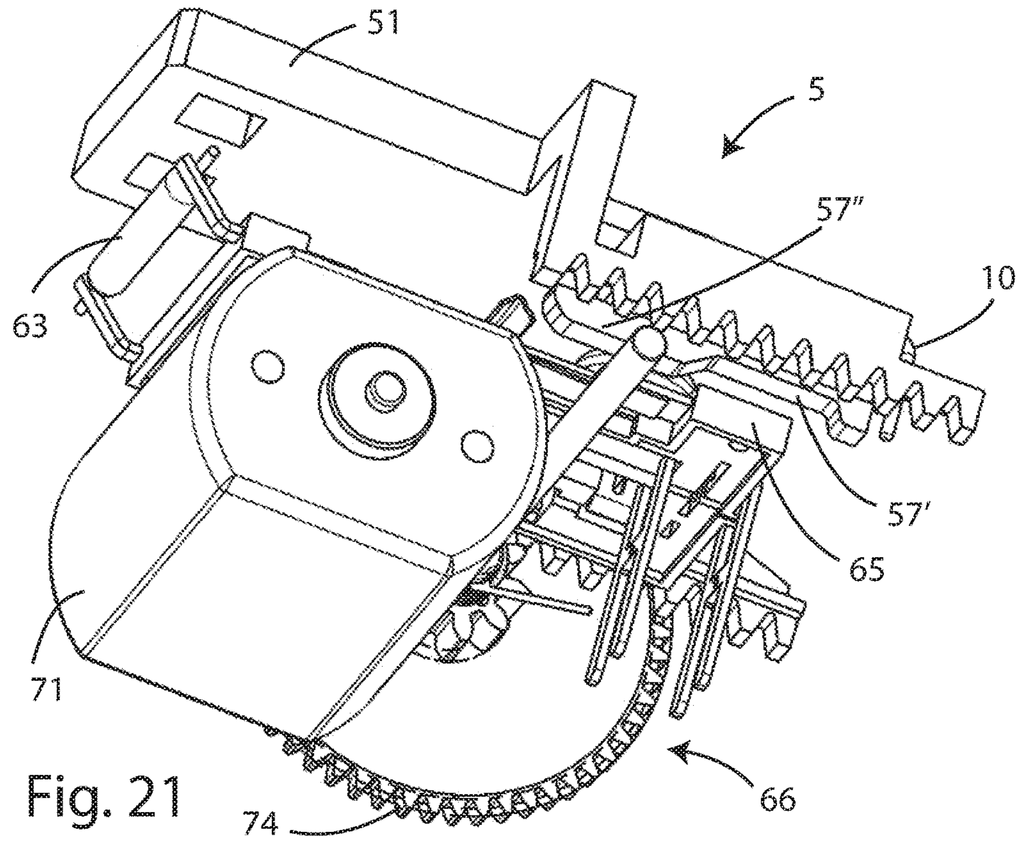
FIG. 21 shows a detail in perspective of the door locking device according to FIG. 20 without containment elements and some motion transmission members.
Figure 22:
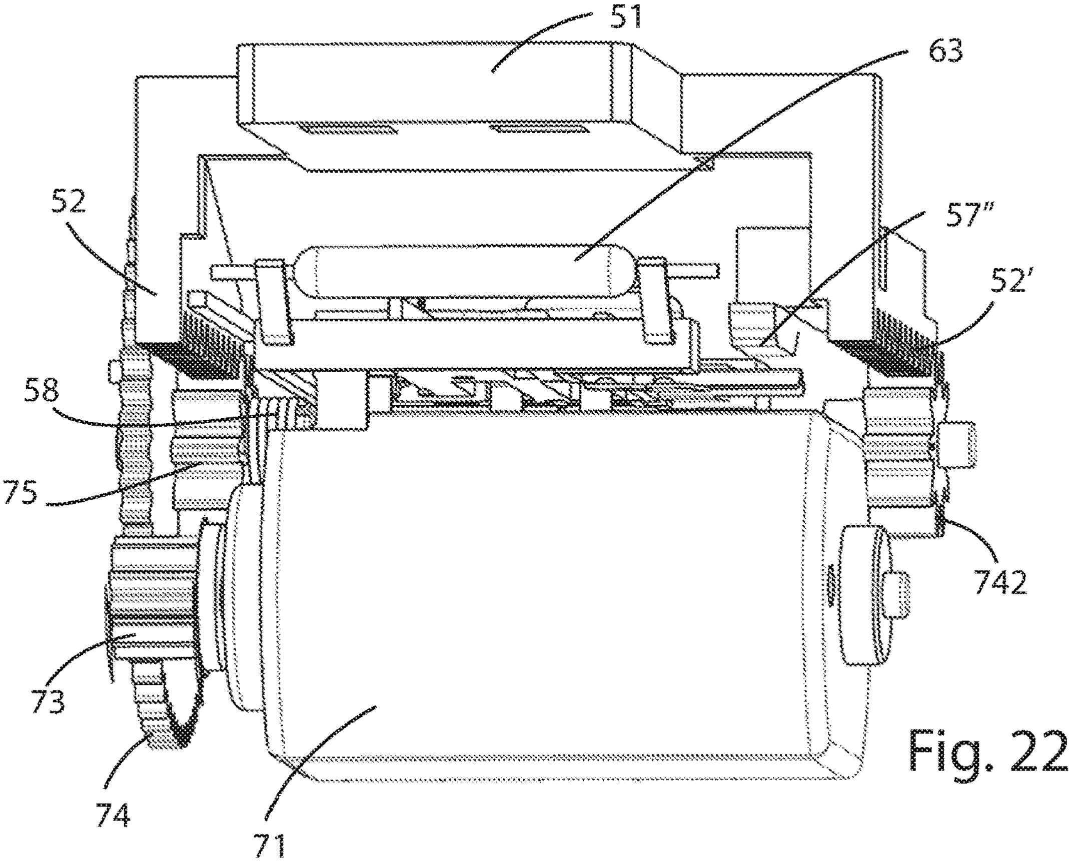
FIG. 22 shows a further perspective view of the detail of FIG. 21.
Figure 23:
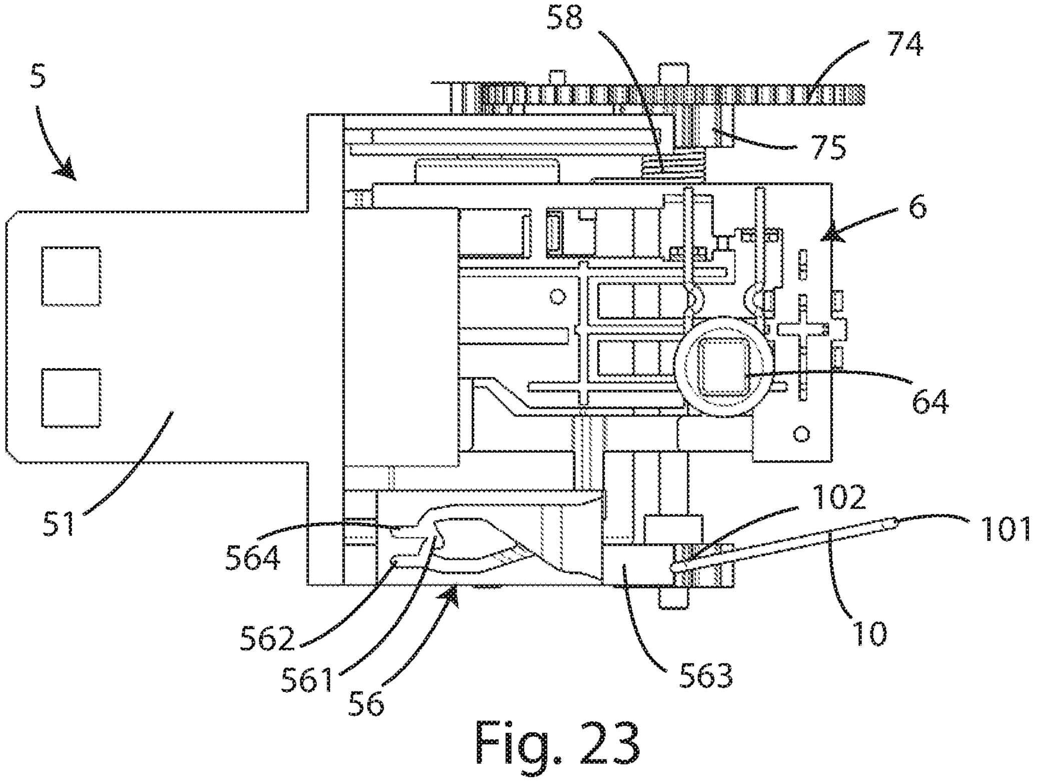
FIG. 23 shows a top view of the open door locking device according to FIG. 20.
Figure 24:
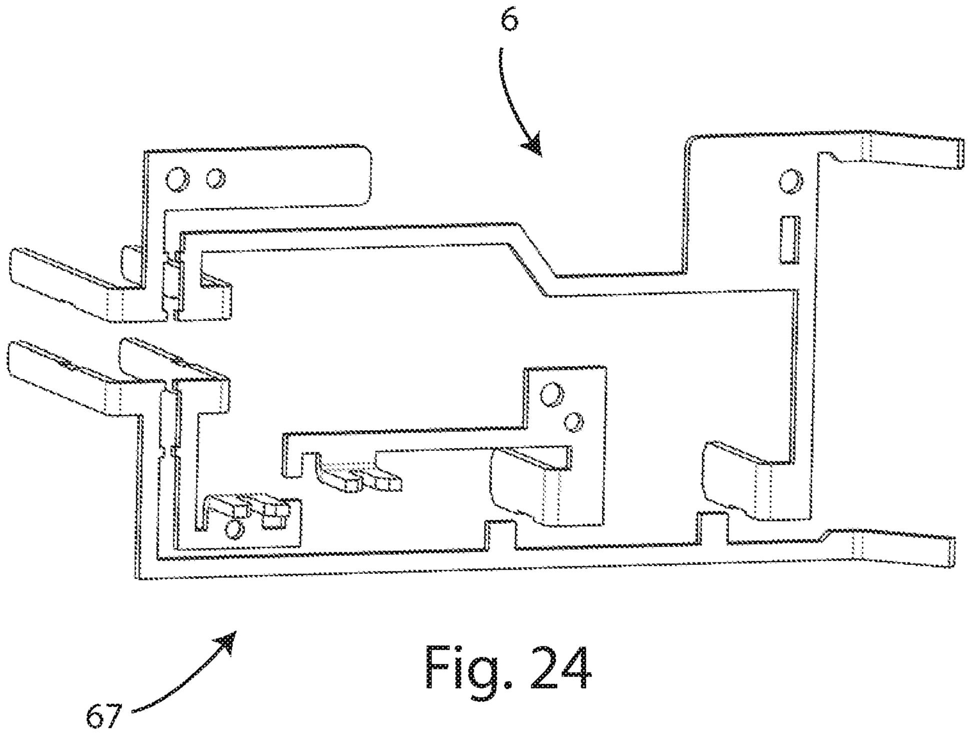
FIG. 24 shows a perspective view from the bottom of the control electronics of the door locking device according to FIG. 20.

In case of an excessive amount of water would fall on the slider 5, while it is in the extracted position, such that the groove 511 of the locking portion 51 is not able to collect it all and allow it to drip to the sides, the ribs 54 will tend to collect the water on the flat drainage element 55, which in turn will make it converge on the upper surface 33 of said containment intermediate element 3, so that, through the bulkheads 361 and 362, it can flow without risking to drip onto the electronic part of the electronic control unit 6 or on the electric connector 62, as shown in FIG. 19, in which the flows of the dripping water are distributed with dashed arrows.

In particular, it can also be observed how the flat drainage element 55 facilitates the water outflow from the surface of the locking portion 51 of the slider 5 onto the upper surface 33 of said containment intermediate element 3.

If, further, the water should still penetrate, for example, due to particularly violent splashes, between the containment element 3 and the top lid 4, in this case, the water would still tend to be contained between the parallel bulkheads 361, so as to lie on the upper surface 33 of the containment intermediate element 3 and subsequently, guided again by the bulkheads 361, to bifurcate into two flows guided by the bulkheads 362, so as to prevent water and humidity from reaching the electronic control unit 6 and the connector 62.

Referring now to FIGS. 20-24, the structure of a second embodiment of the door locking device according to the present invention is observed.

In particular, the similar parts will not be described again, only the modifications with respect to the first embodiment described above will be considered hereinafter.

In particular, it can be observed that the slider 5 comprises, in addition to the rack 52, a further rack 52', in correspondence with which, on a surface in particular in this case facing upwards, a constrained path 56 is obtained, having a first seat 561, a second seat 562, opposite to said first seat 561, a third seat 563, arranged on the rear of said first seat 561, and a fourth seat 564, opposite to said first seat 561, and parallel to said second seat 562. In addition, the door locking device 1 comprises a control member 10, having a first end 101, hinged on said containment element 3, and a second end 102, engaged or arranged so as to slide in the aforementioned constrained path 56.

Said slider 5 also comprises a tooth 57, which cooperates with the switch 67 by opening it, as better defined hereinafter, a depressed portion 57', which does not activate the switch 67, leaving it closed, a raised portion 57", at the same height tooth 57, which cooperates with the switch 67 by opening it. The function and the effect of the signals generated by the interaction between the tooth relieve 57 and the portions 57' and 57" with the switch 67 will be better described below.

The door lock 1 of the second embodiment in question also has a return spring 58, intended to return the slider 5 to the extracted position, as will be better explained below.

In the present embodiment, the gearwheel 74 of said moving means 7 has a shaft 741, to the end of which a further pinion 742 is connected, intended to engage with said further rack 52'.

Figure 25:
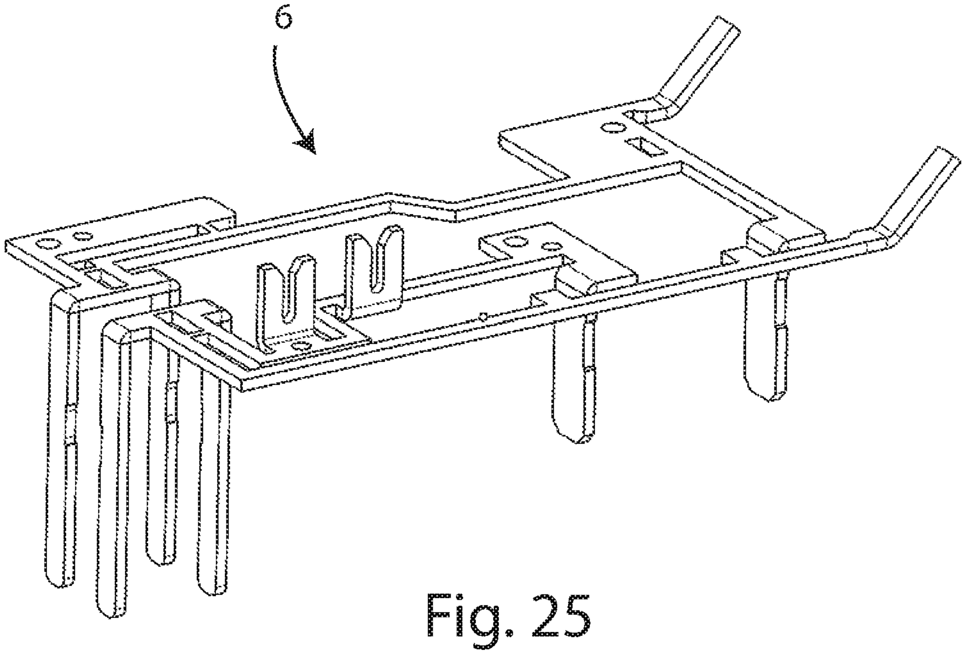
FIG. 25 shows a detail of the control electronics of the door locking device according to FIG. 20.

The electronic control unit 6 (see FIGS. 24-26) is realized by means of a molded plastic support 65, within which slopes and metal connections 66 are arranged, suitably sheared.

Said electronic control unit 6 also comprises a switch 67 having a relief 671, intended to engage with the tooth 57 and the portion 57" of said slider 5, when the latter is brought into suitable positions as better detailed below. The motor 71 of the moving unit in its active action (i.e. when powered) tends to make the slider 5 move into the retracted configuration, while the return spring 58 always tends to return the slider 5 to the extracted condition, opposing the action of the motor. In particular, when said slider 5 is extracted, due to the interaction of the tooth 57 and of the portion 57" with the relief 671 of the switch 67, there are different signals in succession, due to the opening and closing of the switch 67 by means of the relief 671.

In some embodiments, the electronic control unit 6 can be realized by means of a printed circuit (as in the first embodiment described above) or other systems for the realization of electrical or microelectronic circuits.

Figure 26:
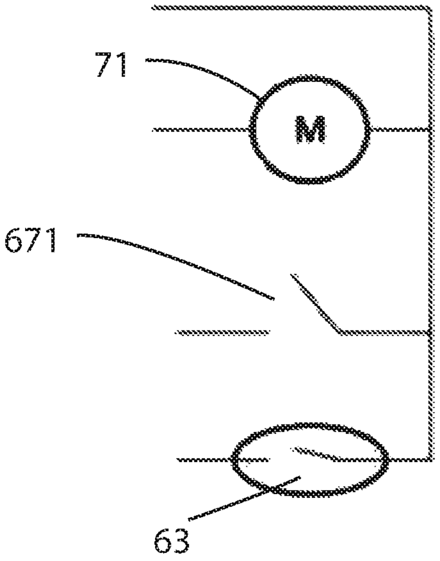
FIG. 26 shows the electric circuit of the control electronics of the door locking device according to FIG. 20.

Referring to FIG. 26, an electrical diagram and some main control connections between the electric motor 71, the reed switch 63 and the switch 67 can be seen.

The operation of the second embodiment of the door locking 1 described above is as follows.

The structure of the door locking device 1 according to the present embodiment is similar to that described with respect to a first embodiment. Therefore, the operation in the case of drops falling on it is completely similar to that of the first embodiment described above.

Figure 27:
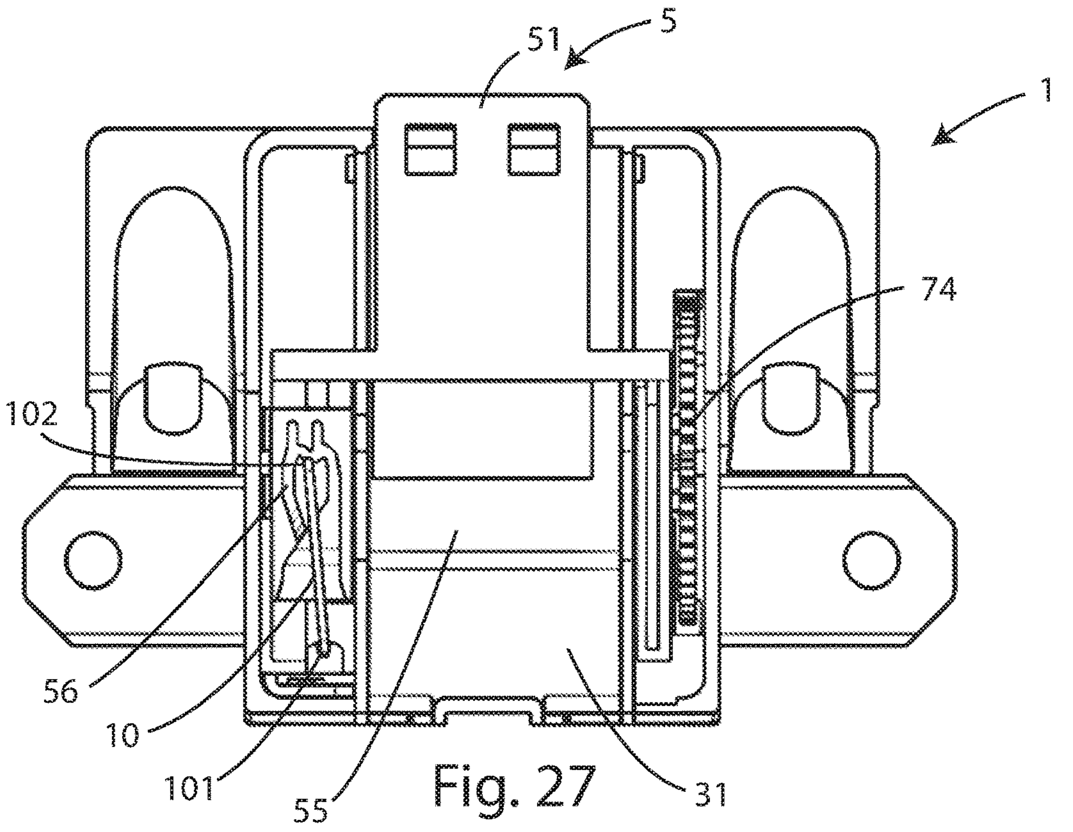
FIG. 27 shows a top figure of the door locking device open in a first operating configuration.
Figure 28:
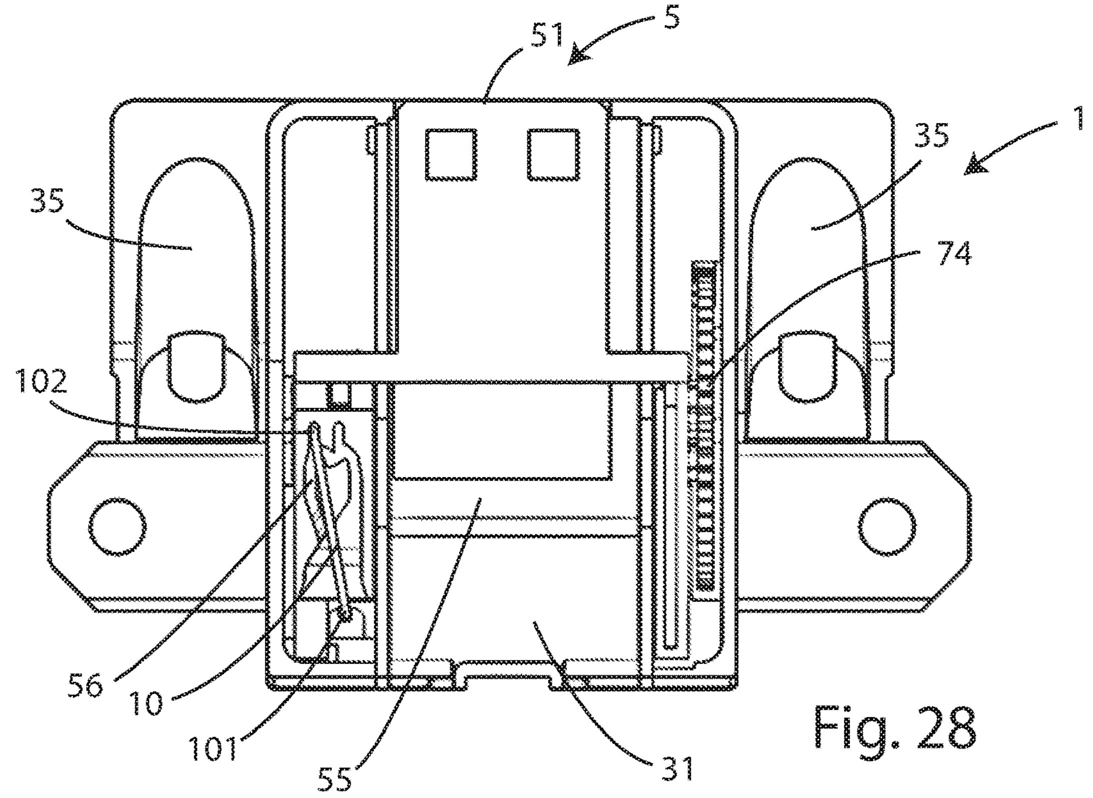
FIG. 28 shows a top figure of the open door locking device in a second operating configuration.

On the other hand, as regards the functional operation of the door locking device 1, starting from the configuration of FIG. 27, in which the slider 5 is in the retracted position, the return spring 58 tends to make the slider 5 extracted, the motor is off, the switch 67 is open (since the relief 671 interacts with the portion 57") and the control member 10 is in traction opposing a reaction to the spring 58. When, in order to extract the slider 5, the electric motor 71 is activated by the household appliance control logic (not shown in the figures), by rotating according to the arrow A, the pinion 73, moved by said gearwheel 74, which in turn moves said further pinion 742, acting on the racks 52 and 52', brings the second end 102 of said control member 10 from said first seat 561, to said second seat 562, as shown in FIG. 28. In this step, the contact 67 closes, since the relief 671 passes beyond the portion 57" from the opposite part of the tooth 57.

Figure 29:
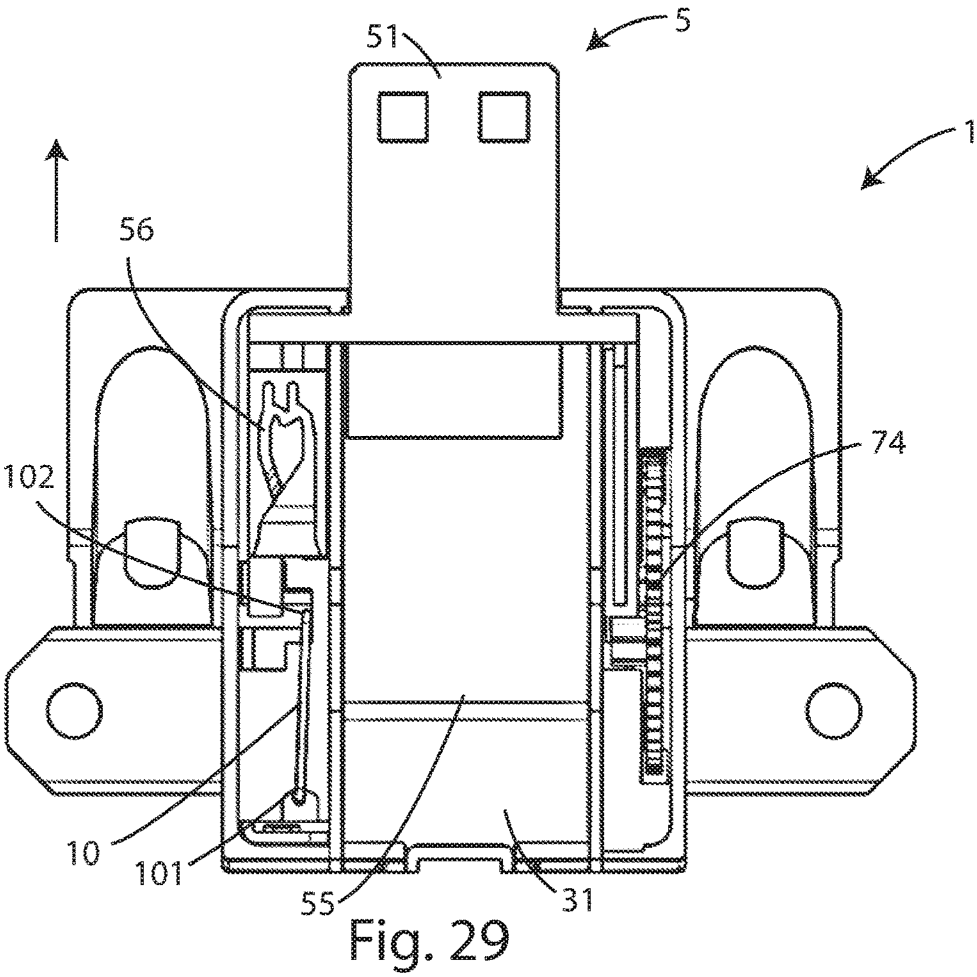
FIG. 29 shows a top figure of the open door locking device in a third operating configuration.

Subsequently, because of the interruption of the action of said motor 71, due to the timing effect after the slider 5 has reached the stop 3611 (or by reading the closure of the switch 67, since the relief 671 has moved beyond the portion 57", opposite to the tooth 57), following the action of the return spring 58, said second end 102 is constrained to position itself in said third seat 563, allowing said slider to pass from said retracted position, to said extracted position, as shown in FIG. 29. The position 563 along the direction of motion is not defined by the member 10, but its extension is based on the interaction of the slider 5 with the door of the household appliance, which must be locked (not shown). Basically, the extension or the stroke of the slider 5 is limited (by defining the position 563 on which the end 102 of the member 10 on the slider 5 stops) by the fact that the free end of the slider 5 touches against a wall of the door of the household appliance to be locked.

At the same time, in this extracted position the relief 671 moves to the portion 57', in which it has no interference, closing the switch 67. In this way, the control logic of the household appliance can determine that the slider 5 is in the extracted position.

Figure 30:
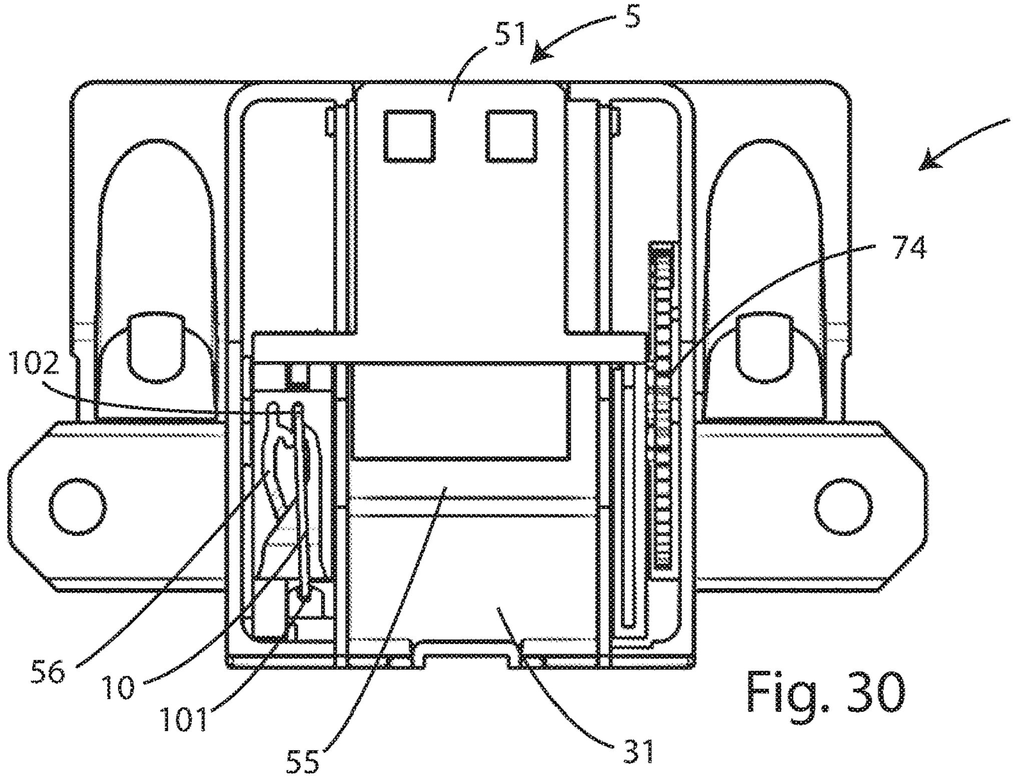
FIG. 30 shows a top figure of the open door locking device in a fourth operating configuration.

Subsequently, following a further actuation of the motor 71, always rotating according to the arrow A, said second end 102 of said control member 10, passes from said third seat 563 to said fourth seat 564, as shown in FIG. 30, generating the same position conditions of the slider 5, spring 58 and state of switch 67 reported in the state represented in FIG. 28. In fact, the end 102, while remaining on another seat 564 of the constrained path with respect to the seat 562 of FIG. 28, the height along the direction of the motion is identical.

Naturally, as soon as the motor 71 stops its action, the return spring 58 moves the second end 102 from said fourth seat 564 to said first seat 561.

In this way, said slider 5 passes from said extracted position to said retracted position.

In this way, it is possible to make the slider 5 pass from the retracted position to the extracted position and vice versa, by rotating the electric motor 71 only in one rotation direction, so as to considerably simplify its control.

The tooth 57 intervenes in a particular and anomalous operating condition, i.e. the one in which, due to some unauthorized use, the system is activated not in the presence of the household appliance door and therefore the stroke of the slider 5 is not interrupted by contact with the free end of the slider 5 against the household appliance door (which is not present in this anomalous condition). In other words, there is an extra stroke of the slider 5 beyond the normal condition of a locked door, in which the relief 671 is placed in correspondence with the portion 57'. To signal this extra stroke, the tooth 57 intervenes, which, interacting with the relief 671 of the switch 67, sends an excessive stroke signal, causing the household appliance to be in fault. An advantage of the door locking according to the present invention is that it is particularly compact.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A door locking device (1) comprising a containment casing (I), having a window (34), a slider (5), comprising a locking portion (51), intended to engage with a door (91) of an appliance (9), wherein said slider (5) is contained in said containment casing (I) and wherein said slider (5) is capable of assuming a retracted position, in which said locking portion (51) is at least partially contained in said containment casing (I), and an extracted position in which said locking portion (51) is at least partially extracted from said containment casing (I), moving through said window (34), wherein the slider (5) moves along a movement direction, and a moving and controlling system (6, 7) of said slider (5), configured for allowing the passage of said slider (5) from said retracted position to said extracted position and vice-versa, characterized in that said containment casing (I) comprises a base (2), a containment intermediate element (3), couplable with said base (2), said containment intermediate element (3) comprising:

an upper surface (33), a couple of parallel bulkheads (361), arranged at the lateral edges of said upper surface (33), and further bulkheads (362), extending along a lateral surface opposite to the one on which said window (34) is located, arranged so as to surround a front opening (37), wherein an electronic control unit is disposed below said containment intermediate element (3), and a top lid (4), couplable with said containment intermediate element (3), wherein said moving and controlling system (6, 7) is arranged between said base (2) and said containment intermediate element (3) and wherein said slider (5) is interposed between said containment intermediate element (3) and said top lid (4), said slider (5) comprises lateral ribs (54) for containing water drops that fall on said locking portion (51) and drain them on the upper surface (33) of said containment intermediate element (3), said locking portion (51) has a groove on the top (511) and/or two through holes (512, 513) for allowing drainage of water that falls on said locking portion (51) when said slider (5) is in said extracted position, wherein the lateral ribs (54) are parallel to the movement direction of the slider (5), and wherein the groove is configured for drainage of the water in a direction perpendicular with respect to the movement direction of the slider (5).

2. The door locking device (1) according to claim 1, characterized in that said slider (5) comprises a flat drainage element (55), arranged at the rear of said locking portion (51) and having a steep or a slightly sloping surface, in order to drain water on said locking portion (51) on the upper surface (33) of said containment intermediate element (3).

3. The door locking device (1) according to claim 1, characterized in that said moving and controlling system comprises the electronic control unit (6) comprising in turn:

a print circuit board (61) arranged below of the upper surface (33) of said containment intermediate element (3) and an electrical connector (62) intended to be connected to a logic control unit of an appliance, wherein said electrical connector (62) is connected to, and fixed on said print circuit board (61) and wherein said electrical connector (62) is arranged at the front opening (37); or is made of a comolded plastic support (65), inside tracks and metal connections (66) are arranged.

4. The door locking device (1) according to claim 1, characterized in that said base (2) has a first housing (21) and a second housing (22), in that said slider comprises a rack (52) and in that said moving and controlling system comprises moving means (7) comprising in turn an electric motor (71), arranged in said first housing (21) of said base (2), reducing members (73, 74), arranged in said second housing (22) for transferring the motion from said electric motor (71) to said rack (52) for allowing the passage of said slider (5) from said retracted position to said extracted position and vice-versa.

5. The door locking device (1) according to claim 1, characterized in that said top lid (4) comprises a flat portion (41), having longitudinal reliefs (411), arranged parallel to each other, adapted to channel the water that falls on it, and a steep portion (42) having edges facing downwards.

* * * * *